Figure 1:
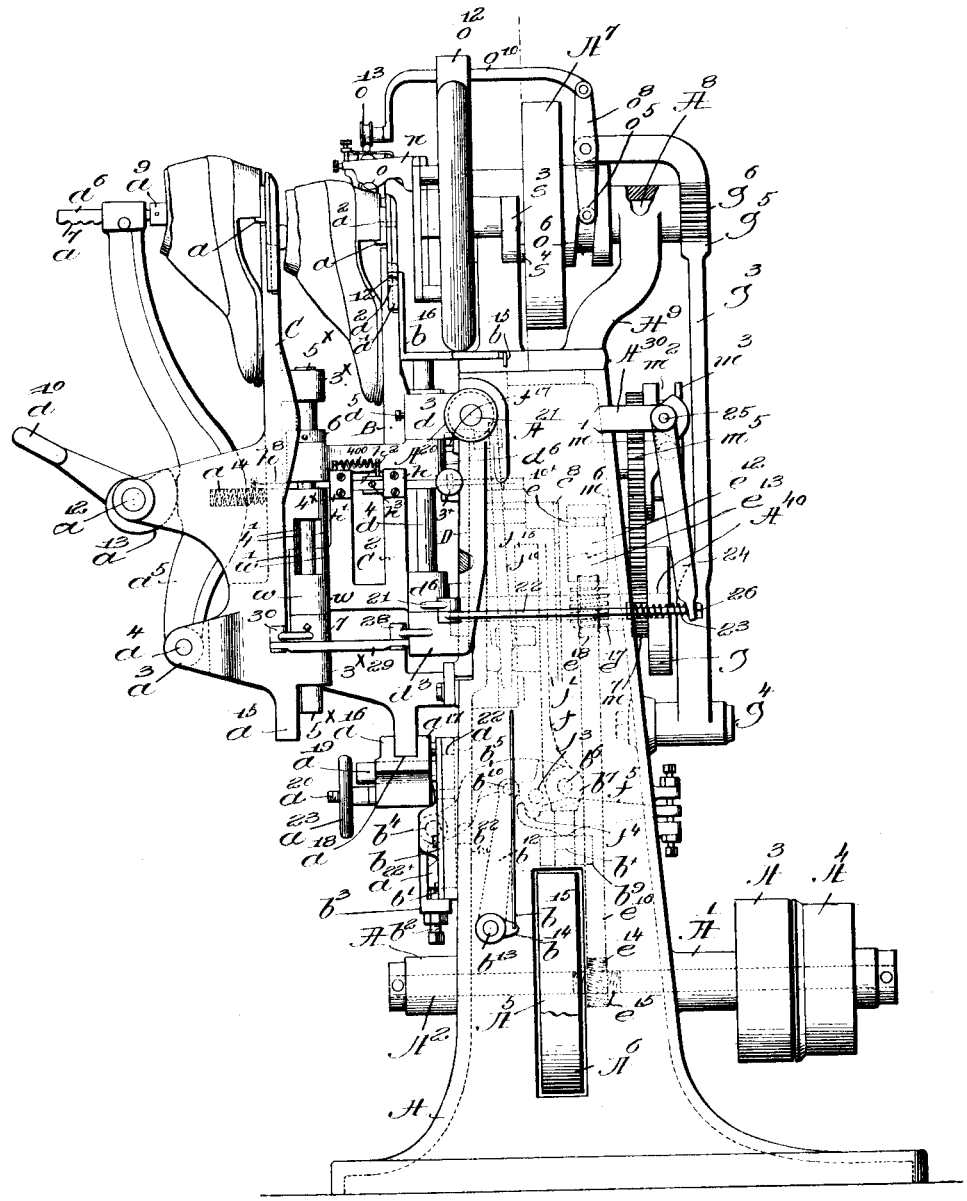

A. M. ENGLISH.
HEEL BURNISHING MECHANISM.
APPLICATION FILED SEPT. 4, 1906.

1,109,213.

Patented Sept. 1, 1914.
11 SHEETS—SHEET 1.

A. M. ENGLISH.
HEEL BURNISHING MECHANISM.
APPLICATION FILED SEPT. 4, 1906.

1,109,213.

Patented Sept. 1, 1914.
11 SHEETS—SHEET 2.

A. M. ENGLISH.
HEEL BURNISHING MECHANISM.
APPLICATION FILED SEPT. 4, 1906.
1,109,213.
Patented Sept. 1, 1914.
11 SHEETS—SHEET 3.
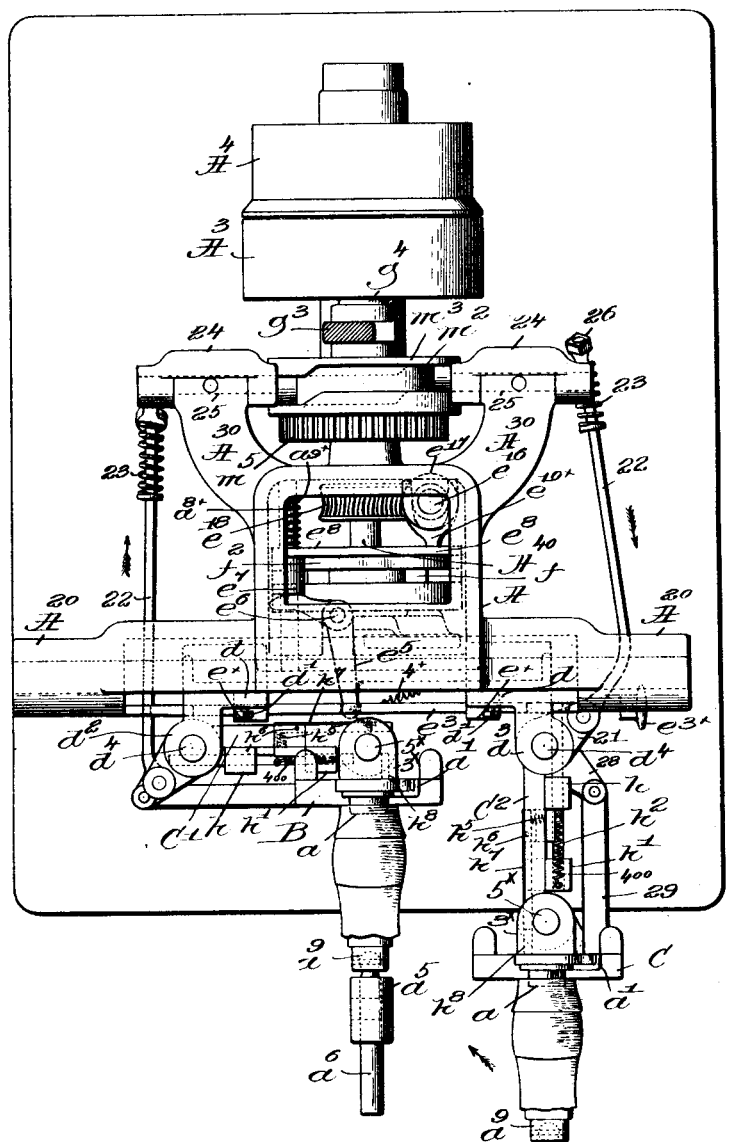
Fig. 3.
Fig. 4.
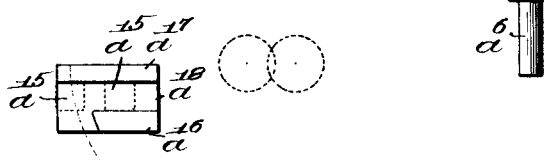
Witnesses:
Fred S. Greenleaf.
W. C. Hunsford.
Inventor.
Arnaldo M. English,
by Crosby & Gregory
Attys.

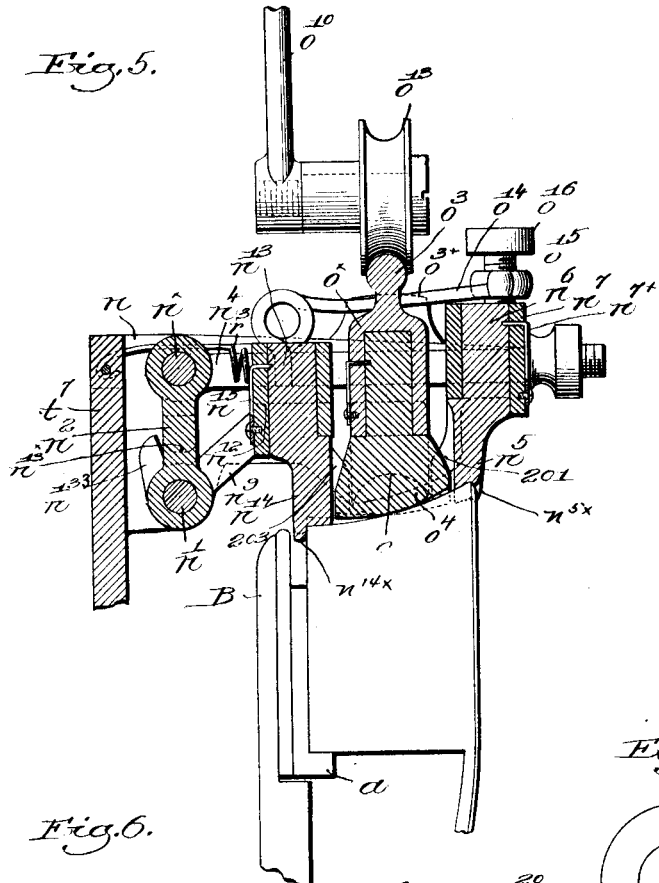

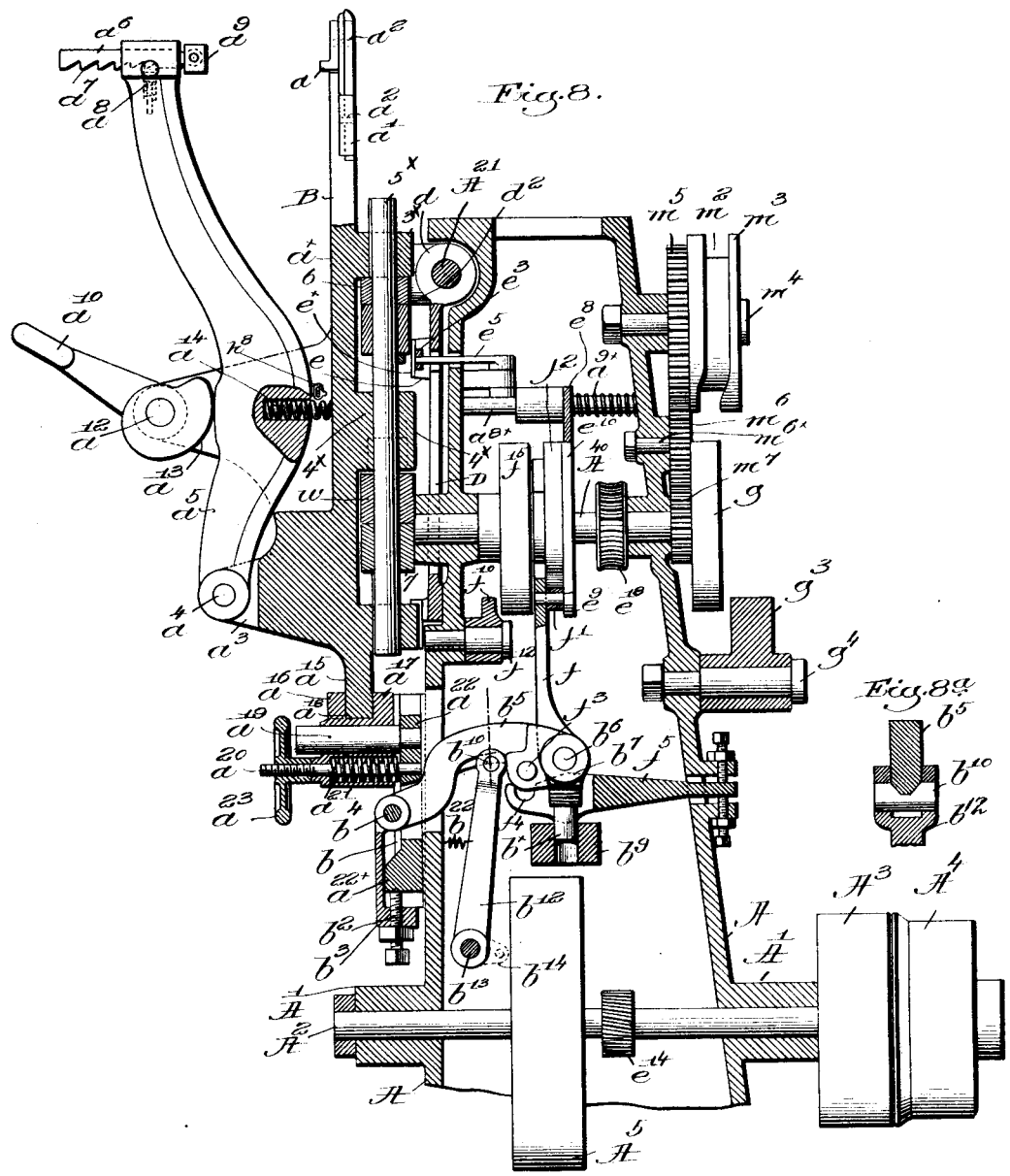

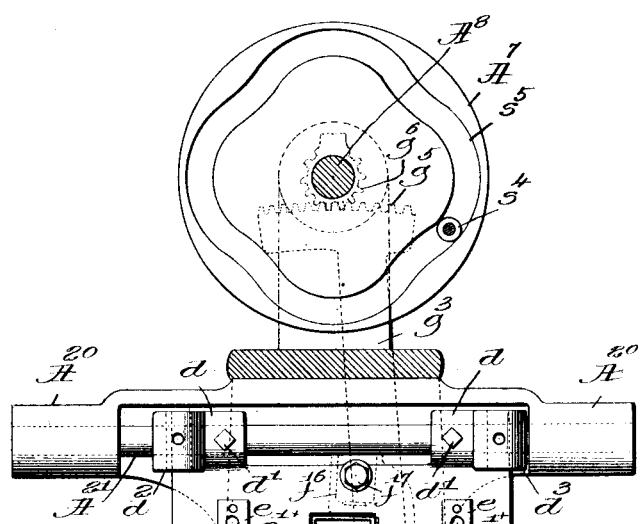
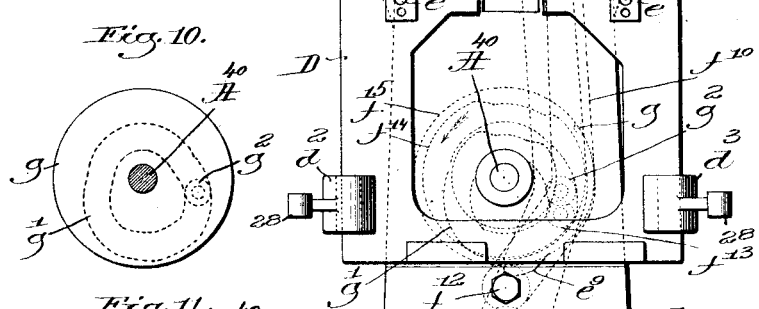
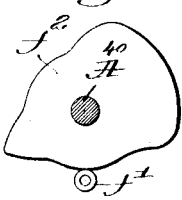
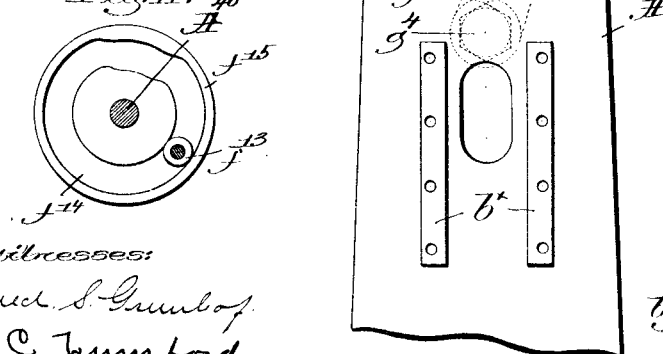

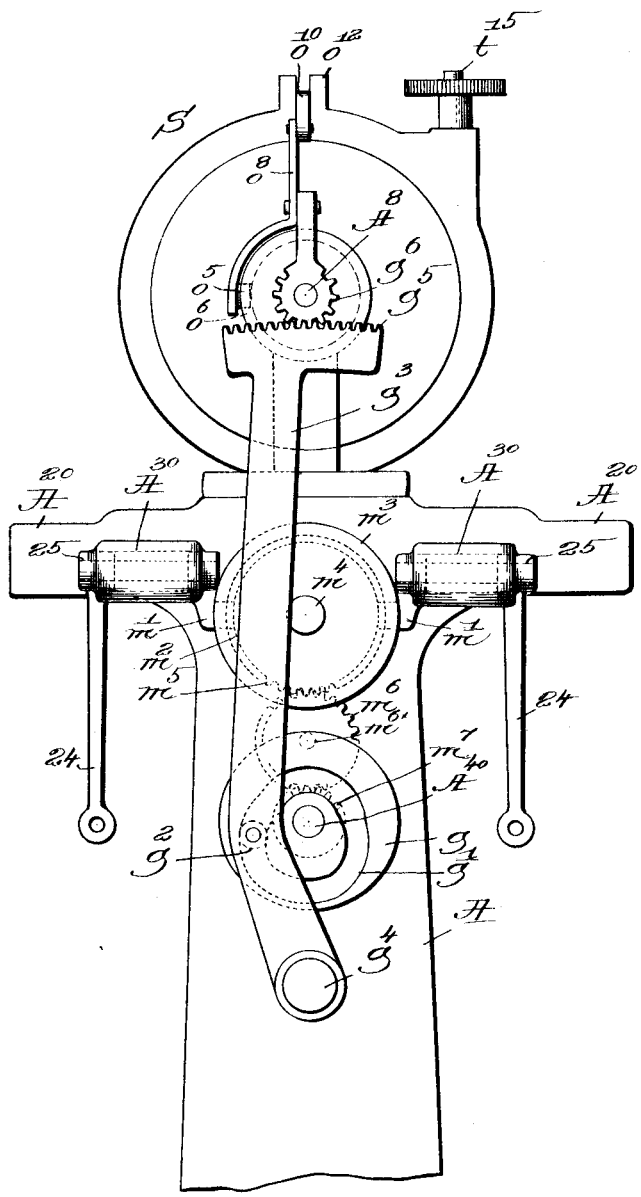

A. M. ENGLISH.
HEEL BURNISHING MECHANISM.
APPLICATION FILED SEPT. 4, 1906.
1,109,213.
Patented Sept. 1, 1914.
11 SHEETS—SHEET 8.
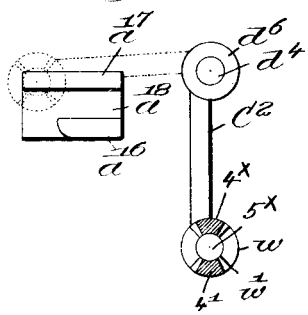
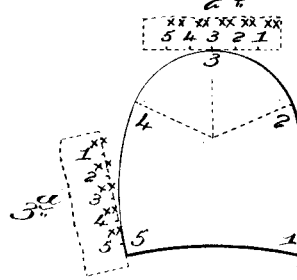
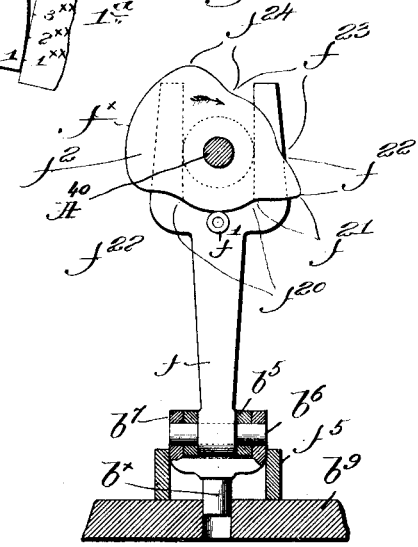

A. M. ENGLISH.
HEEL BURNISHING MECHANISM.
APPLICATION FILED SEPT. 4, 1906.
1,109,213.
Patented Sept. 1, 1914.
11 SHEETS—SHEET 9.
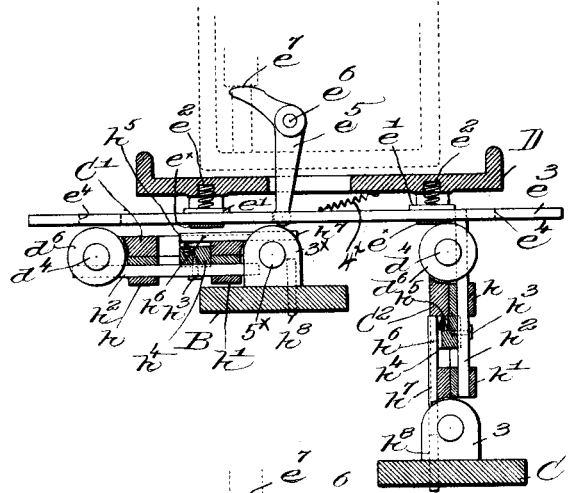
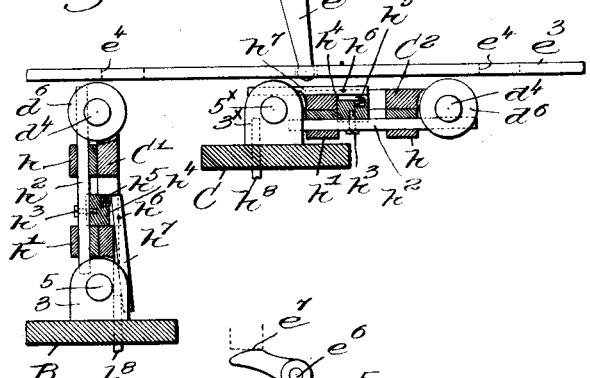
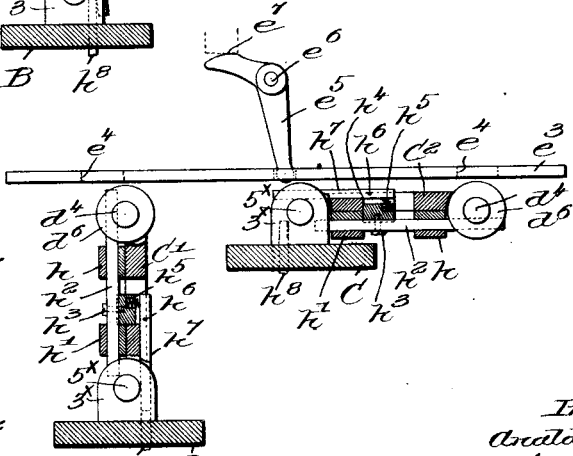

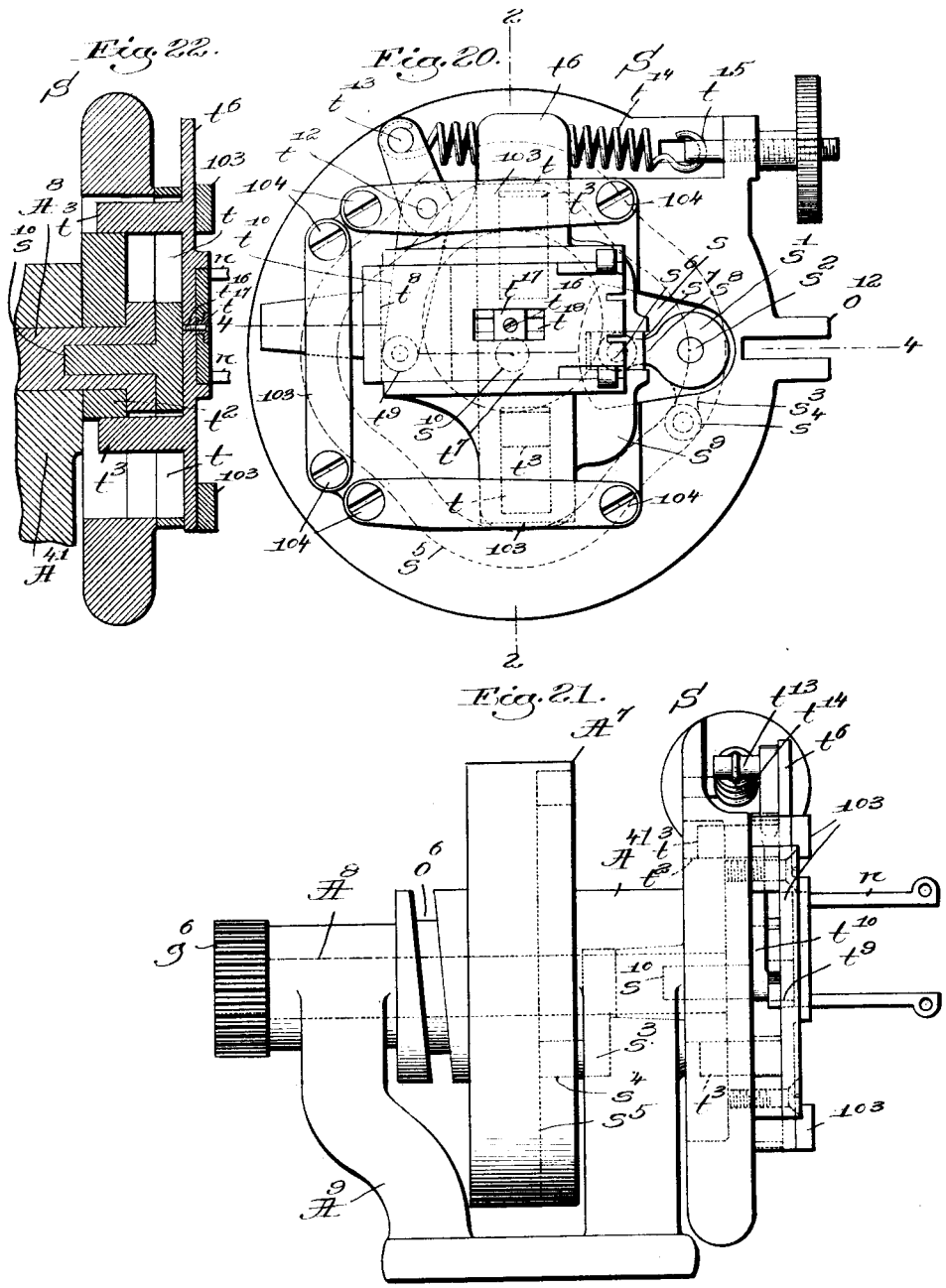

A. M. ENGLISH.
HEEL BURNISHING MECHANISM.
APPLICATION FILED SEPT. 4, 1906.
1,109,213.
Patented Sept. 1, 1914.
11 SHEETS—SHEET 11.
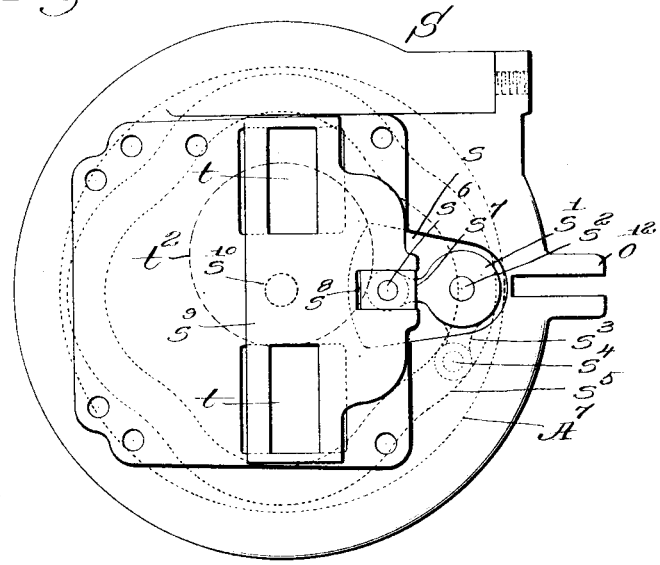
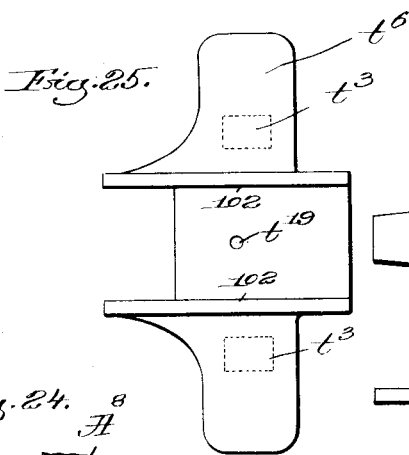
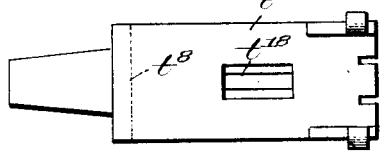
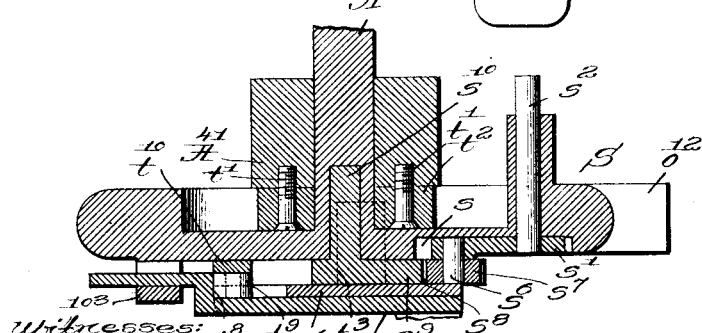

UNITED STATES PATENT OFFICE.

ANALDO M. ENGLISH, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

HEEL-BURNISHING MECHANISM.

1,109,213.   Specification of Letters Patent.   Patented Sept. 1, 1914.

Application filed September 4, 1906. Serial No. 333,062.

*To all whom it may concern:*

Be it known that I, ANALDO M. ENGLISH, a citizen of the United States, and a resident of Boston, in the county of Suffolk and State of Massachusetts, have invented an Improvement in Heel-Burnishing Mechanism, of which the following description, in connection with the accompanying drawing, is a specification, like letters on the drawing representing like parts.

This invention has for its object the production of a novel machine for burnishing or treating heels of boots and shoes, more especially heels varying in shape or contour from one to the opposite breast corner about the exterior of the heel, or heels of the class concaved at the back or at the back and sides, but my novel machine may be used to burnish heels of any shape.

My invention contemplates where desired the use of a plurality of jacks, adapted to be moved independently one of the other and preferably automatically put into operative position with relation to a heel-burnishing tool, so that while one jack occupies its operative position the other jack may occupy its inoperative position, in which latter position a shoe having a burnished heel may be removed and a shoe having a heel to be burnished may be substituted, the employment of a plurality of jacks greatly increasing the output of the machine. The jacks may have combined with them means for automatically varying the extent to which the jack and shoe thereon may be moved relatively to provide for burnishing heels of different sizes or heels of different length from the breast to the back of the heel. By the length of the heel, I mean to designate the distance from the breast of the heel to its back at the heel-seat, which I designate the heel-seat end of the heel, and by its height, the distance from the face of the top-lift to the top of the heel-seat end of the heel. The rand of the heel is the bevel at the top edge of the sole to which the heel is nailed, the rand-crease being the space between the rand and the back of the upper covering the usual counter.

In the manufacture of shoes, the heel is trimmed and thereafter burnished, and in practice it is found that burnishing tools as at present constructed fail to leave a true surface at the exterior of the heel particularly in case of lack of truth in the heel surface due to fault in trimming the same.

The burnishing tool embodying my invention in its broad scope, presents a surface in the direction of the height of the heel corresponding with the shape in which the heel is to be left by the action of the tool.

The burnishing tool shown is represented as composed of a plurality of parts, the faces of which, where they contact with the exterior of the heel, are straight, or slightly curved; that is, convexed or concaved, according to the exterior of the heel, the particular shape of the parts of the tool contacting with the heel being varied according to the shape of the heel to be burnished. The tool has given to it a series of to and fro motions and at the same time, the tool is made to traverse the exterior of the heel from one to the other breast corner, each forward stroke of the tool reaching a point a little in advance of the previous stroke, each backward stroke arriving at a point not quite so far back as the next preceding stroke, and as the tool creeps about the heel, a new portion of the face of the tool meets the exterior of the heel, so that during the burnishing of each heel, parts of the face of the tool operate in succession on some part of the exterior of the heel.

The different sections of the tool contact with different portions of the exterior of the heel in the direction of its height and the tool is spring pressed toward the heel. The tool may also be moved in the direction of the height of the heel while traveling about the exterior thereof, and the tool may be heated in any usual manner, if desired.

The shoe having the heel to be acted upon is sustained by a jack, the level of which is changed during the operation of burnishing each heel, and the burnishing tool that burnishes the heel of the shoe on the jack has imparted to it a variable movement as it moves about the exterior of the heel, the movement, as herein provided for, being slower when acting upon the sides of the heel than when acting upon the curved parts of the heel, and while the burnishing tool works about the exterior or rear part of the heel, the jack, with its shoe, occupies its stationary position.

Figure 2:
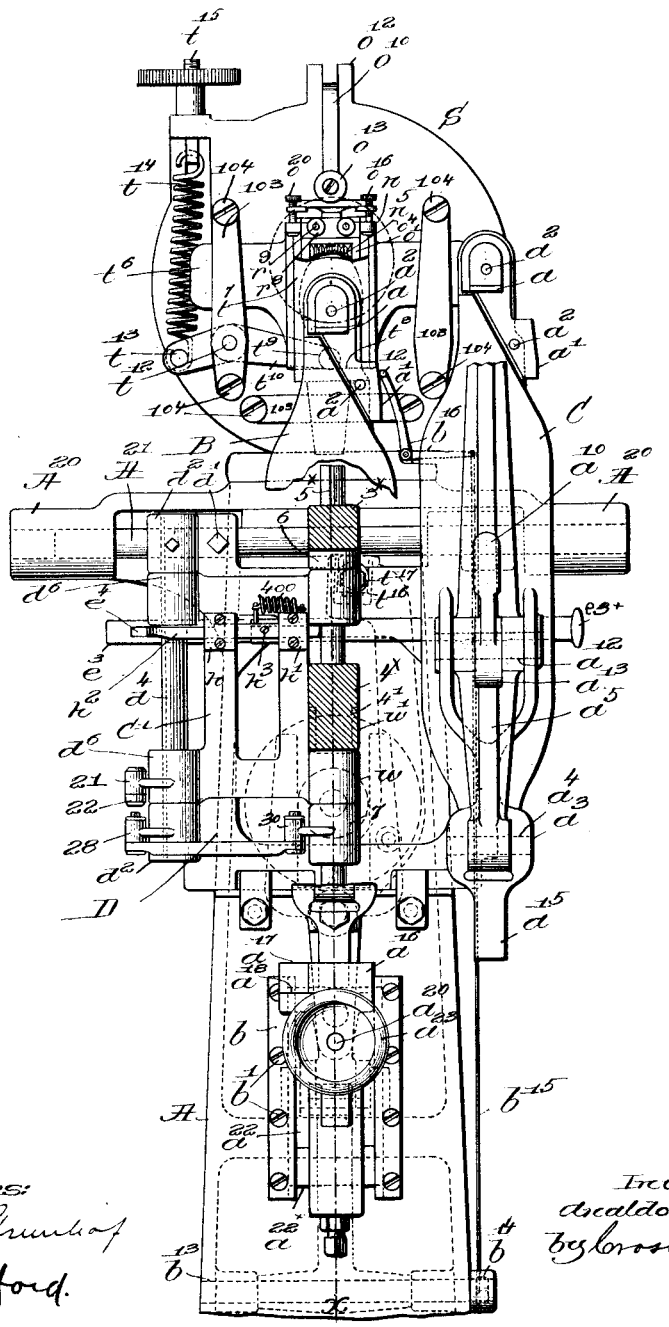

Figure 1 is a right hand side elevation of a burnishing machine in which I have embodied my invention in one of the best forms now known to me; Fig. 2 is a front elevation thereof; Fig. 3 is a top view with the head carrying the burnishing tool or tools removed; Fig. 4 is a diagram showing part of a table to be hereinafter referred to; Fig. 5 is a sectional detail of the burnishing tool shown as in position on the exterior of the heel; Fig. 6 is a plan view of the parts shown in Fig. 5; Fig. 7 is a right hand end view of Fig. 5, the part of the burnishing tool for acting on the rand and top of the heel being omitted; Fig. 8 is an enlarged sectional view illustrative of the jack mechanism, the section being in the line $x$, Fig. 2; Fig. 8$^a$ is a sectional detail showing the controller engagement with the recessed saddle; Fig. 9 is a detail looking at the machine from its front side, chiefly to show the carriage carrying the gate sustained on the framework of the machine and actuating parts for moving the carriage and for rotating the shaft in the head; Figs. 10, 11 and 12 show in detail the cams represented in Fig. 9 on the shaft; Fig. 13 is a detail looking at the rear of Fig. 9, chiefly to show the parts for revolving the shaft in the head and for changing the position of the jacks; Fig. 14 is a diagram showing different positions of the gate carrying the jack shaft and the table referred to; Fig. 15 is an outline of a heel to be burnished; Fig. 16 is a detail showing part of the mechanism for imparting vertical movement to the jacks; Figs. 17, 18 and 19 are diagrams showing the different positions taken by the gates carrying the jacks in the operation of heel burnishing; Fig. 17 shows the gate carrying the left-hand jack in the position where the heel carried by the jack mounted in that gate has just been burnished and the right-hand jack having been provided with a heel has effected automatic locking of that jack to an actuator, the movement of which controls the continued operation of the machine, in order that the right-hand jack, provided with a shoe, may be automatically moved into position to have its heel burnished, without stopping the machine; Fig. 18 shows the left-hand jack as having been put into its inoperative position and the right-hand jack as going into operative position, to be acted upon by the burnisher; Fig. 19 shows the right-hand jack in its fully operative position, the right-hand side of the heel at the breast corner being supposed to be in contact with the heel burnisher; Fig. 20 is an enlarged front view of the head for carrying the burnished tool, the tool being removed; Fig. 21 is a left-hand side elevation of Fig. 20; Fig. 22 is a section on the line 2—2, Fig. 20; Fig. 23 is a view looking at Fig. 20 with some of the parts therein shown removed; Fig. 24 is a section of Fig. 20 in the line 4—4; Fig. 25 shows the auxiliary plate removed from Fig. 20; Fig. 26 shows the tool-holder removed from the auxiliary plate shown in Fig. 20; Fig. 27 is a top view of the tool-holder Fig. 26.

The framework A of the machine of suitable shape to sustain the working parts has bearings A′ for the main shaft A$^2$ of the machine provided with fast and loose pulleys A$^3$, A$^4$, and a pulley A$^5$, the latter receiving a belt A$^6$ that encircles a pulley A$^7$ loose on shaft A$^8$, see Fig. 21, in the frame head A$^9$ of the machine, said pulley being the actuator for the burnishing tool to be described, said pulley having fixed to it at one side a hub having a cam groove $o^6$ to be described.

The machine herein to be described is adapted to handle a plurality of shoes, the heels of which are to be burnished, a shoe when applied to a jack being brought automatically into operative position with relation to the path of movement of the burnishing tool to be hereinafter fully described.

The jacks are alike and their like parts may be designated by like letters, but I have for distinguishing the jacks designated the left-hand jack by the letter B and the right-hand jack by the letter C. Each jack B and C has like top and bottom bosses 3$^×$ and a central boss 4$^×$ shaped at its under side to present teeth with notches between. The top and bottom bosses are connected slidably by a spline with a like shaft 5$^×$ revolubly sustained in a swinging support or gate C′, C$^2$. Each shaft 5$^×$ has a collar 6 connected thereto by a suitable set screw, said collar resting on the boss at the top of the gate. The shaft 5$^×$ has also a collar 7 connected thereto by a set screw, see Fig. 1, the purpose of which collar will be hereinafter described.

Each jack B, C has at its upper end, see Fig. 8, a detachable heel breast support $a$ that may be readily removed from the jack for the reception of another support according to the size and shape of the heel to be burnished. Each heel breast support pinned to the jack by pins $a^2$ has as shown a pattern leg $a′$, the shape or width of which varies according to the length of the heel to be burnished.

Each jack has at its front side ears $a^3$ sustaining a stud $a^4$ upon which is pivoted the lower end of a shoe-clamping device $a^5$ shown as a lever provided at its upper end with an adjustable rod $a^6$ suitably toothed or notched at $a^7$ that it may be held by a locking device $a^8$ in any adjusted position according to the thickness of the comb of the last and the height of the heel of the shoe applied to the last, the end of said rod having a swiveling contact piece $a^9$ that bears against the comb of the last.

When jacking a shoe, the contact piece $a^9$ will be adjusted to nearly contact with the cone of the last, and thereafter through the arm $a^{10}$ fast on shaft $a^{12}$ having a cam $a^{13}$ acting upon a part of the lever $a^5$, said lever will be moved to cause the contact piece $a^9$ to act upon the cone of the last and firmly hold the top-lift of the shoe against the heel breast support $a$, a part of said support also receiving against it the top-lift end of the shoe, the sole of the shoe being pressed against a plate $a^x$ forming part of the jack, the shoe being in this way "jacked" as it is called.

The lever $a^5$ has a spring $a^{14}$ that acts normally to move the same away from the shoe when the cam $a^{13}$ is in position to permit said spring to act, it being understood while the heel of one shoe is being burnished that the workman has time to remove a shoe having a burnished heel from the jack then in its inoperative position as shown by jack C, and to supply in its place another shoe having a heel to be burnished when the jack C is brought into its operative position at the burnishing tool.

Each jack has a foot $a^{15}$ that when the jack arrives in its operative position and just before the shoe heel is placed in the path of movement of the burnishing tool passes the end of a wall $a^{16}$ extended upwardly from a table $a^{18}$, see Figs. 4 and 8, and contacts with the inner side of a longer wall $a^{17}$ of said table, said table sustaining the jack throughout its movement while a shoe heel is being burnished.

Referring to Fig. 8 where the table is represented in section, it will be observed that the table is mounted on a horizontal stud $a^{19}$ extended from a slide $a^{22}$ and that below said stud said slide is provided with a threaded rod $a^{20}$ surrounded by a spring $a^{21}$ that enters a spring-holding chamber in the table, one end of the spring abutting a shoulder of the chamber, the opposite end abutting said slide. The threaded rod has applied to its outer end an adjusting device $a^{23}$ shown as a wheel nut which when rotated in one direction permits the spring to move the table $a^{18}$ to the left viewing Fig. 8 to adapt the machine for burnishing a higher heel, and by turning the adjusting device in the opposite direction so that its hub contacts with the table, the latter is moved toward the slide $a^{22}$, compressing the spring and adapting the position of the table and jack to a heel of less height.

The slide $a^{22}$ carrying the table and the threaded rod $a^{20}$ and the pin $a^{19}$ may be moved vertically in guides $b$ resting on the surfaces of the column of the machine, the guides being held in place by screws $b'$. The slide $a^{22}$ has a foot $a^{22x}$ that is acted upon by an adjusting screw $b^2$ carried by a link $b^3$ jointed at $b^4$ to one end of a controller $b^5$ shown as a lever pivoted at its rear end on a pin $b^6$ of a vertically movable yoke having a foot $b^x$ fitting loosely a hole in a cross piece $b^9$ forming part of the machine frame.

The under side of the controller $b^5$ is shaped as best shown in Fig. $8^a$ where said controller is represented in section as resting on a recessed saddle $b^{10}$ carried by a lever $b^{12}$, said saddle and lever constituting a variable fulcrum, said lever being mounted on a short shaft $b^{13}$ having as represented an ear $b^{14}$ that is operatively connected by a rod $b^{15}$ with a lever $b^{16}$, see Figs. 1 and 2, shown as of elbow shape and pivoted on a stud carried by the head of the machine, the upturned arm of said lever being provided with a roller 12 that contacts with the exterior of the pattern leg $a'$ carried by the heel breast support, so that according to the width or shape of said pattern leg, they varying according to variations in size and length of heel, the variable fulcrum may be moved automatically to change its position under the controller, so that when the latter is moved as will be described over said fulcrum while the table on which the foot of the jack rests is being lowered and raised, the down and up strokes of the table will be adapted to the length of the heel.

The stud $b^6$ of the yoke $b^7$ is embraced by the forked end of the controller $b^5$ through which said pin $b^6$ is passed, see Fig. 16, and by the lower end of a slide bar $f$ having its upper end forked to embrace a shaft $A^{40}$, said bar having a roller or other stud $f'$ that is acted upon by a cam $f^2$, as will be more fully described, fixed to said shaft, and during the operation of burnishing a heel the lever $b^{12}$ controlled by the pattern leg occupies a position demanded by said pattern leg, and at the conclusion of the burnishing operation and while the jack occupies its elevated position, the part $f^x$ of said cam $f^2$ of largest radius acts on the roller $f'$ of said bar, depresses the stud $b^6$ and yoke, rocking the controller $b^5$ over the variable fulcrum described until the projection $f^3$ extended from said controller enters the bearings $f^4$ at the upper side of an adjustable lever $f^5$ near one end thereof, thus leaving the controller $b^5$ fulcrumed momentarily upon said adjusting lever. While the controller $b^5$ is so momentarily sustained by the lever $f^5$ the lever $b^{12}$ of the variable fulcrum will remain in the position occupied thereby until the jack having the burnished heel is moved to the left, as will be described, preparatory to turning the jack having the heel which has been burnished into its inoperative position, at which time a spring $b^{22}$ will pull said lever $b^{12}$ to the left Fig. 8, thus putting the roller 12 in position to be acted upon by the pattern leg of the next jack to be brought into operative position with relation to the burnishing tool, and if the pattern leg is of the same shape and width as the pattern leg connected with the jack having a shoe the heel of which was just burnished, the variable fulcrum will be moved into the same position, but if the heel is of a different size or length, then the variable fulcrum through the action of said leg on the roller 12 will be moved into the proper position to sustain the controller while the burnishing tool next acts upon a heel, the controller not being deposited upon the variable fulcrum until after the jack having the heel to be burnished is brought into its operative position.

The pull of the spring $b^{22}$ when permitted to act is sufficient to turn the lever $b^{12}$ into a position for the shortest heel to be burnished. In the rotation of the cam $f^2$ after the foot of the jack has been deposited on the table, the weight of the jack thereon, acting through the table, causes the controller to be seated on the variable fulcrum in whatever position it occupies according to the length of the heel to be burnished. It will be understood that whenever the size or length of the heel to be burnished varies sufficiently to require it, the jack will be provided with a suitable heel-seat support and pattern leg of the particular shape or width required for that particular length of heel.

The free end of each gate has a boss $w$ that receives a rod $5^x$ forming part of each jack B or C, and the lower boss of each pair of bosses $d^2$ $d^3$, see Figs. 1 and 9, of the carriage D to be described has a like projection 28 with which is jointed a link 29 said link at its opposite end being jointed to a lug 30 projecting from the collars 7 secured one to each of the rods $5^x$.

After the foot $a^{15}$ of each jack is swung, as will be described, over the table and contacts with the wall $a^{17}$, said wall acts to locate the top-lift end of the heel in line with the path of the burnishing tool to act on the top-lift, and thereafter as the jack with its foot is moved between said walls, as shown by dotted lines at the right, Fig. 4, this being done by moving said carriage longitudinally, the shoe heel being put into the path of movement of, and to be acted upon by, the burnishing tool, and while the heel is being burnished, the jack will be maintained accurately in position and the tool will commence to act on the side of the heel at its breast corner 1, see Fig. 15, the table and jack being in their elevated position, and thereafter the jack will be lowered until the side of the heel at about the point 2 is brought into the line with the burnishing tool, and thereafter the shaft $A^8$, with its longitudinal axis located in head $A^9$ and within the bounds of the exterior of the heel, carrying the burnishing tool to be described will be rotated say for substantially a half-rotation in a circular path by a lever $g^3$ to cause the burnishing tool to travel about the rear end of the heel to about the point 4, when the heel will be again raised, causing the burnishing tool to act upon the exterior of the heel from the point 4 to the opposite breast corner 5.

As soon as the tool has traversed over the exterior of the heel once, from one to its opposite breast corner, it being supposed that the heel is elevated while the tool is acting upon the side of the heel next said breast corner, the table $a^{18}$ and jack are lowered, causing the burnishing tool to act from the corner 5, along the side of the heel to the point 4, when the shaft referred to will again be rotated in the opposite direction, taking with it the burnishing tool, causing the same to travel about the rear end of the heel to the point 2, and thereafter the jack will again be raised, causing the tool to act on the exterior of the heel from the point 2 to the first breast corner.

The speed of rotation of the shaft $A^8$, carrying the head and burnishing tool, to be described, varies, it being slower while the tool acts on the heel from the point 1 to point 2 and from point 4 to point 5 and vice versa, the speed being the greatest while the tool acts on the curved exterior of the heel, between the points 2 and 4, the speed being substantially uniform while acting from 2 to 4 and vice versa.

Viewing Fig. 15, I have shown in diagram three positions of the central portion of the burnishing tool and while the heel is being burnished at or near its breast corner 1, the portion $1^{xx}$ of the burnisher contacts with the heel and it will be understood that the points $2^{xx}$, $3^{xx}$, $4^{xx}$, and $5^{xx}$ of the tool become operative with the numbered parts 1, 2, 3, 4 and 5 of the heel successively and when the burnishing tool is acting about the exterior of the heel from one to its other breast and in the reverse order when in its backward movement about the heel. This completes the burnishing of a heel and immediately the jack B having the shoe containing the burnished heel, is moved in the present instance of my invention to the left, through a movement of the carriage D to be described, removing the heel from the path of movement of the burnishing tool, so that the jack may be swung away from the tool into its inoperative position that the shoe having the burnished heel may be removed from jack B, and another shoe having a heel to be burnished be applied thereto, during which operation, the jack C, having been provided with a shoe, is swung automatically into its operative position, the foot of that jack being moved to occupy a position over said table against the wall $a^{17}$, and in operative relation to the burnishing tool, and the heel of the shoe carried by jack C is put in contact with the burnishing tool, as above described with relation to the heel of the shoe carried by jack B.

Fig. 3 shows the jack B in the position it will occupy after a heel has been burnished, and as that jack is moved away from burnishing position, the foot of jack C having a shoe, the heel of which is to be burnished, will be moved independently of jack B into working position with relation to the burnishing tool, and that these jacks may be so moved, I have provided the following means.

Referring to Fig. 9, the frame A has bosses $A^{20}$ that receive loosely a guide-rod $A^{21}$ that receives ears $d$ of a carriage D, said ears receiving set screws $d'$ by which to confine the carriage to said rod. The carriage also has two pairs of ears $d^2$, $d^3$, each pair of ears receiving a like rod $d^4$ fixed in said bosses by suitable screws $d^5$. Each rod forms a fulcrum for a like jack support or gate C' and C², each gate having bosses $d^6$ at its inner end that embrace loosely one of the rods $d^4$ and contact with the bosses $d^2$, $d^3$, so that the gates may be swung freely on the carriage D at the proper times about said rods $d^4$.

Each lower boss $d^6$ of each gate, has a projection 21 with which is connected gate-swinging means comprising a link 22 threaded at one end and extended loosely through a hole in the lower end of the jack or gate-swinging device 24, shown as a lever pivoted at 25 on ears $A^{30}$ projecting from the frame A, said rod being surrounded at the inner side of said device 24 by a spiral spring 23, the threaded end of the rod having applied thereto a nut 26 that may be adjusted thereon according to the extent of outward movement desired for the jack as the same is moved into its inoperative position, said spring yielding as the device 24 is moved toward the left Fig. 1 to cause the foot of the jack to cross the table and meet the inner wall $a^{17}$ thereof, said spring yielding when said foot strikes said inner wall, said spring compensating for any variation in the position of the table when the jack is being moved into operative position with relation to the burnishing tool and before the jack is moved laterally between the side walls $a^{16}$, $a^{17}$ of said table.

As hereinbefore noted, the burnishing tool commences and finishes its operation at the same side or breast corner of a heel, and this it does whether the shoe be supported by either of the jacks. In the present form of the invention this action of the burnishing tool commences and ends at the breast corner at the right side of the heel, viewing Fig. 15, consequently when one heel is finished and another is to be placed in position, the jacks must be moved to the left to properly permit the movement of one jack out of and the other into operative position, and this movement is herein utilized to continue the operation of the machine in case the jack next to be moved into operative position is properly supplied with a shoe and to stop the machine in case said jack does not contain a shoe, as will now be explained.

In the present form of the invention, a carriage D having the jacks connected thereto, is mounted for lateral movement and has connected thereto an actuator or clutch controller, which when moved to the left, in the present form of the invention, maintains the clutch members in clutching relation or out of the path of a lug or tappet which on its upward movement would otherwise disengage the clutch members, so that when a properly packed shoe on either of the jacks is moved to the left to position the heel with relation to the burnishing tool, the clutch controller or actuator is also correspondingly moved, and the machine continues in operation.

In the present embodiment of the invention the carriage D is provided below the ears $d$, Fig. 9, with lugs $e$ sustaining loops $e^x$, Figs. 3 and 17, inside of which are placed followers $e'$, backed by appropriate springs $e^2$, said followers being thus forced into frictional engagement with the slide or clutch controller $e^3$ to retard too free sliding movement thereof. The springs $e^2$ may rest in suitable seats $e'^x$ formed in said lugs $e$. The slide bar or clutch controller $e^3$ near each end has an opening $e^4$ and between said openings it is engaged with one end of a lever $e^5$, Figs. 3, 17, 18, 19, fulcrumed on a rod $e^6$, the short arm of said lever abutting the hub $e^7$ of a clutch operating member or lever $e^8$, Figs. 1, 3, and 8. This lever $e^8$ is mounted to slide upon a rod $a^{8x}$, and is normally under the influence of a spring $a^{9x}$ acting to maintain said lever in the path of a lug or projection $e^9$ carried by a cam plate $e^{10}$ on the shaft $A^{40}$. The lever $e^5$ when turned to the left or clockwise, Fig. 3, acts upon the hub $e^7$ to maintain the shipper lever $e^8$ pressed back against its spring $a^{9x}$ and out of the path of the lug or projection $e^9$ as the latter rises from its low position, as indicated in Fig. 8, said position being assumed when the jack next to be moved into operative position contains a properly jacked shoe, as will presently appear.

As shown by Fig. 1, the main shaft $A^2$ has a worm or spiral gear $e^{14}$ operatively engaged with a worm wheel or gear $e^{15}$ at the lower end of a shaft $e^{16}$, which at its upper portion has a worm $e^{17}$ mounted loosely on said shaft and engaged with a worm wheel $e^{18}$ fast on the shaft $A^{40}$. The loose worm $e^{17}$ has fixed to or formed to rotate therewith, a clutch member $e^{13}$ also loose on said shaft $e^{16}$. Splined to or otherwise secured to rotate with the shaft $e^{16}$ is the clutch member $e^{12}$, Fig. 1, said member $e^{12}$ being engaged by the forked end $e^{10x}$ of the shipper lever $e^{8}$, Figs. 1 and 3, the construction being such that should the lever $e^{5}$ be moved to the left or clockwise, Fig. 3, the lever $e^{8}$ will be moved to the right, Fig. 8, against the stress of the spring $a^{9x}$ and out of the path of the lug or projection $e^{9}$, Fig. 8, as the latter rises from its low position and consequently the clutch members $e^{12}$ and $e^{13}$ will remain in engagement and the machine will continue to operate; but should the lever $e^{5}$ be not so turned, then the lever $e^{8}$ will be met by the lug or projection $e^{9}$ as it rises and the clutch members will be disengaged and the machine stopped.

Movement of the lever $e^{5}$ to the left is placed under the control of the slide or actuator $e^{3}$, as hereinbefore explained, and means are provided in connection with each jack, so that should the jack next to be moved in operative position and moved to the left to bring the right side of the heel into operative relation with the burnishing tool, be properly supplied with a shoe, the slide or actuator $e^{3}$ will be also moved to the left to turn the lever $e^{5}$ in the manner stated and continue the operation of the machine. Said means comprises a longitudinally movable rod or so-called starting device $h^{2}$ mounted on each jack, so that if the jack next to be moved to operative position by swinging it about the pivotal connection with the carriage and then moving it to the left to position the heel and burnishing tool be provided with a jacked shoe, the end of the rod or starting device $h^{2}$ will be engaged with the adjacent slot or opening $e^{4}$, and thereafter as the jacks and carriage D are moved to the left, the slide $e^{3}$ will also be moved in the same direction against the stress of a spring, such as $4^{x}$, Fig. 3 with the result that the machine will continue in operation, through the means hereinbefore described. Should the jack, however, be not provided with a shoe, the rod or starting device $h^{2}$ will not be forced inward to engage one of the slots or openings $e^{4}$ and consequently, even though the jack be swung inward, its following leftward movement to place the right side of the heel in operative relation with the tool, will not cause leftward movement of the slide or part $e^{3}$, and the machine will be stopped.

Each gate has at its outer side two guides $h$, $h'$ that serve to guide a starting device $h^{2}$ that in its operative position, see Fig. 17, enters one of the slots $e^{4}$ in the actuator $e^{3}$. Each starting device $h^{2}$ has connected with it by a screw $h^{3}$ a block $h^{4}$ recessed at one side for the reception of a spring $h^{5}$. This block has also a stud $h^{6}$ on which is mounted a dog $h^{7}$, the longer end of the dog being acted upon by a feeler $h^{8}$ connected with the lever $a^{5}$ of the jack and movable therewith, said feeler meeting the longer arm of said dog as the lever under the action of the cam $a^{12}$ effects the clamping of a shoe to the jack. The inward movement of the dog effects the inward movement of the starting device $h^{2}$ against a spring, as 400 and causes its inner end to enter one of the slots of said actuator according to which jack is being moved into its operative position.

Fig. 17 shows the starting device $h^{2}$ of the jack C, the one next to be put into its operative position, as having entered a slot $e^{4}$ and as having moved the actuator to the left as the carriage D was moved to the left, thus effectually maintaining the clutch $e^{12}$, $e^{13}$ closed.

A portion of the forked upper end of each of the like devices 24, see Fig. 13, has a depending arm $m'$ provided with a roller stud that enters a cam groove $m^{2}$ in a cam $m^{3}$ mounted on a stud $m^{4}$, see Fig. 8, the inner side of the cam having as part of it a gear $m^{5}$ that is in mesh with an intermediate pinion $m^{6}$ mounted on the stud $m^{6x}$ in turn geared with the pinion $m^{7}$ on shaft $A^{40}$.

When a shoe has been properly jacked, this being done while the actuator occupies the position shown in Fig. 3, the starting device $h^{2}$ is thrust into one or the other slot $e^{4}$ of the actuator, according to which jack has just been provided with a shoe and it will be supposed that the jack C has received a shoe and is next to be moved into its operative position.

When the heel of the shoe of jack B has been burnished and the heel is to be removed from the path of movement of burnishing tool, the lever $f^{10}$ is actuated to move the carriage D to the left, and inasmuch as the device $h^{2}$ of jack C stands in a slot $e^{4}$ of the actuator $e^{3}$ as represented in Fig. 3, the actuator is also moved turning the lever $e^{5}$ and moving the shipper lever $e^{8}$ so that it will not be struck by the cam $e^{9}$, and the machine will not be stopped, and as the left-hand jack B is moved to the left by the carriage D and lever $f^{10}$ to remove the burnished heel away from the burnishing tool, the foot $a^{15}$ of the jack B is moved over the table $a^{18}$ across the end of the wall $a^{16}$, and the rod 22 connected with jack B will be moved in the direction of the arrow Fig. 3, and said jack will be swung outwardly into the position Fig. 18, and immediately afterward by movement of the other link 22, jack C will be brought from its position Fig. 17 into the position Fig. 18.

Viewing now Fig. 4, the foot $a^{15}$ of jack C is shown in the position it will occupy when said jack stands in its inoperative or outturned position Fig. 3, and the dotted lines at the left of said sectional foot show the position that the said foot will occupy after the carriage D has been moved to the left from the position Fig. 3, into the position Fig. 17, such movement of said carriage also effecting the removal of the heel of the shoe carried by jack B out of the path of movement of the burnishing tool. When thereafter the rod 22 connected with the gate holding jack B is moved, said jack will be turned into the position Fig. 18, and said jack, it having a shoe the heel of which has been burnished, will be put into its inoperative position, and the other jack having a shoe provided with a heel to be burnished in the further cycle of movement of the machine will be moved in the direction of the arrow thereon Fig. 3, turning the gate $C^2$ carrying jack C inwardly so that the foot $a^{15}$ thereof following in the dotted line path 100 Fig. 4 passes the end of wall $a^{16}$, arrives on top of the table $a^{18}$ and meets the inner side of wall $a^{17}$, and thereafter as described with relation to jack B, the carriage D is moved to the right causing the foot $a^{15}$ of jack C to enter between the walls $a^{17}$ and $a^{16}$ of said table until the heel of the shoe carried by jack C is put into operative position with relation to the path of movement of the burnishing tool.

Fig. 18 shows the position of jack C when its foot has passed the end of wall $a^{16}$, and said jack is thereafter moved as just described to the right into the position shown by Fig. 19, the movement to the right being effected by the lever $f^{10}$ moving the carriage D to the right, the latter taking with it the rods $d^4$ on which the gates $C'$, $C^2$ are swung. The lever $f^{10}$ for moving the carriage D is mounted on a stud $f^{12}$ and is provided with a roller or other stud $f^{13}$ that enters a cam groove $f^{14}$, see Figs. 11 and 9, in the left hand side, see Fig. 8 of a cam $f^{15}$ carried by shaft $A^{40}$. The upper end of said lever is forked as shown in Fig. 9 and embraces a block $f^{16}$ mounted loosely on a stud $f^{17}$ projecting backwardly from said carriage. The shaft $A^{40}$ has a cam $g$ provided with a cam groove $g'$, shown by dotted lines Fig. 10, that is entered by a roller stud $g^2$ projected from one side of a lever $g^3$ having its fulcrum on the stud $g^4$ and provided at its upper end with a toothed segment $g^5$ that engages a gear $g^6$ fast on shaft $A^8$ before described, said shaft being shown by dotted lines in Figs. 1 and 21, and by full lines in Figs. 9, 22 and 24, said shaft sustaining the head S that carries the burnishing tool to be described, said shaft and head being turned at a variable speed, the speed being slower while the burnishing tool acts on the sides of the heel and while the level of the jack is being changed, its faster speed being while the burnishing tool acts on the rounded or circular part of the heel at its end. The longitudinal center of shaft $A^8$ is located within the bounds of the exterior of the heel. The lever $g^3$ and the device for moving it constitute one good form of means for imparting circular movement to the burnishing tool-carrying head S while either of the jacks B and C occupies its operative positions, but my invention is not to be limited to the special means shown for imparting circular movements to said head.

The head S, see Figs. 22 and 24, is shown as connected with and forming part of shaft $A^8$ and consequently said head will be rotated in unison with said shaft. The head is recessed at its front side as at $s$ to receive an arm $s'$ carried by a rock-shaft $s^2$ extended backwardly through a hole see Fig. 24 made in said head parallel to the longitudinal axis of said shaft, the inner end of said shaft $s^2$ being provided with an arm $s^3$ provided with a stud $s^4$ that enters a cam groove $s^5$ cut in the front face of the loose pulley $A^7$, said groove being of such shape as to rock said shaft $s^2$ for a plurality of times, illustrated here as four times, during each rotation of pulley $A^7$ which latter is driven at a high rate of speed, the speed being determined according to the work to be done. The arm $s'$ has a stud $s^6$ that enters loosely a block $s^7$ that in turn enters loosely a notch $s^8$ in the main tool-carrying plate $s^9$ the shape of which is shown by full lines Fig. 23, and partially by full and dotted lines Fig. 20, said main tool-carrying plate having at its back a projection $s^{10}$ that enters a hole made in the shaft $A^8$ in line with its longitudinal center.

The rapid movements of the rock shaft $s^2$ and arm $s'$ oscillate or move rapidly to and fro the main carrying plate $s^9$, thereby imparting to the tool to be described a series of very rapid short strokes, such movement of said plate $s^9$ being continued throughout the cycle of operation of the machine in burnishing a heel, both while the jack is being lowered and raised as described, and while the head S is being rotated, carrying with it the burnishing tool about the rear end of the wheel while the jack occupies its lowered position.

In Fig. 24, $A^{41}$ shows one of the bearings for the shaft $A^8$ and said bearing at its outer side has connected therewith by screws $t'$ an eccentric $t^2$, said eccentric surrounding said shaft $A^8$ and abutting the inner side of said head. The plate $s^9$ has two slots $t$ that receive two lugs $t^3$ extended backwardly, see full lines Fig. 22 and dotted lines Figs. 24 and 25, from an auxiliary carrying plate $t^6$, said lugs embracing said eccentric, and as the plate $s^9$ is oscillated rapidly and the head S is revolved slowly, said lugs move about said eccentric with the head and cause said auxiliary plate to be moved transversely with relation to the longitudinal center of shaft $A^8$, thus insuring for the burnishing tool proper position with relation to the side and back of the heel, as described. The tool-carrier $t^7$ is fitted into the space between the side walls 102 of the plate $t^6$, and is free to be slid therein according to the configuration of the heel to be burnished.

The tool-carrier $t^7$ has a shoulder $t^8$, see Fig. 27, that is acted upon by a roller $t^9$ carried at one end of a lever $t^{10}$ pivoted on a stud $t^{12}$ at the outer side of the head S, the opposite end of said lever having a stud $t^{13}$ with which is connected a spring $t^{14}$ in turn connected at its opposite end with an adjusting device $t^{15}$, shown as a screw provided with a hand nut, the rotation of said nut straining said spring more or less and causing the tool-carrier $t^7$ to be borne with greater or less pressure toward the heel according to the stock in the heel. The plate $s^9$ is kept seated at the outside of head S, the plate $t^6$ on plate $s^9$, and the carrier $t^7$ on the plate $t^6$ by a series of straps 103, each confined in position by suitable screws 104. To limit the inward movement of the carrier $t^7$ by the spring $t^{14}$ when the burnishing tool is not in contact with a heel, the plate $t^6$ is provided with a screw $t^{16}$ that is extended through a block $t^{17}$ laid in a slot $t^{18}$, said screw entering and being held in a hole $t^{19}$ in plate $t^6$, said slot and block being of such length one with relation to the other as to enable the tool carrier to be moved by said spring $t^{14}$ to enable the burnishing tool carried thereby to meet the smaller and greater radius of any heel to be burnished on the machine.

Referring to Fig. 5, $t^7$ shows the burnishing tool carrier, represented in Figs. 26 and 27, and in section Fig. 24, as crossing the head S. The tool carrier $t^7$ is provided with a rod $n'$ on which is mounted loosely a link $n^2$, a boss at the upper end of said link embracing a stud $n^x$, said stud outside said boss receiving bosses at the end of a U-shaped frame $n^4$ that supports a part $n^5$ of the burnishing tool, said part having a depending lip $n^{5x}$ that enters the rand crease and burnishes the rand at the heel-seat end of the heel and a part of the body of the heel adjacent said rand, the face of said part contacting with the heel being slightly concaved where it contacts with the exterior of the heel. The tool $n^5$ has a shank $n^6$ that enters a tubular part $n^7$ of frame $n^4$, and is locked therein by a locking device $n^{7x}$ shown as a spring. The opposite ends of rod $n'$ receive loosely the arms $n^9$ extended from and forming part of a block $n^{12}$, a tubular portion of which receives the shaft $n^{13}$ of the part $n^{14}$ of the burnishing tool said part being slightly convexed where it contacts with the edge of the top-lift and being employed to burnish the edge of said lift and parts adjacent thereto, said part having a lip $n^{14x}$ that contacts with the face of the top-lift near its corners, said shank $n^{13}$ being held by a spring $n^{15}$.

The under edges, see Fig. 5, of the parallel arms of the frame $n$, see Figs. 1, 5 and 7, are recessed, as shown in Fig. 1, said recess being represented as a concavity to receive the upper convex or semi-circular top sides of two like journals from a yoke $o'$, said yoke having a sleeve $o^x$ extended upwardly above said journals, said sleeve being terminated by a semi-cylindrical top part $o^3$ of sufficient length to cross the space between the arms of frame $n$ and to be sustained on projections $o^{3x}$ at the top of said frame, said projections being convexed at their upper ends that the ends of the top part may be moved thereover to and fro.

The sleeve $o^x$ constitutes a holder for the shank of the central part $o^4$ of the burnishing tool, said part being substantially straight in its median line where it contacts with the exterior of the heel, said median line intersecting the axis of the heel and being parallel with the movement of the tool as it traverses the exterior of the heel. The part $o^4$ is shown in Fig. 5 and one edge of said part, at one side of said median line, see Fig. 7, is slightly concaved, said part acting to burnish the body of the heel between its upper and lower ends.

The contiguous surfaces of the parts $n^5$, $n^{14}$ and $o^4$ are toothed or so shaped that a projection from one part, see Fig. 5, enters a space in the other part, said projections and spaces being more or less in engagement according to the height of the heel, said projections and spaces being in deeper engagement when burnishing the sides of the heel than when burnishing the back or rear part of the heel which is usually of greater length than the side of the heel near the breast corner. By sustaining the different parts of the burnishing tool independently one of the other and providing the same with projections and spaces, said parts are rendered automatically adaptable to heels of different heights. The portion $o^4$ of the tool is oscillated about the heel through the plate $s^9$ described, and is also rocked or reciprocated rapidly in the direction of the height of the heel between the parts $n^5$ and $n^{14}$. To rock as represented the part $o^4$ of the burnishing tool, I have provided a lever $o^8$ having at its lower end a roller $o^5$ that enters the irregular groove $o^6$ in the hub of pulley $A^7$. The upper end of the lever $o^8$ has a link $o^{10}$ jointed thereto and extended through a guide $o^{12}$, the free end of said link, bent as shown, having a stud on which is mounted loosely a sheave $o^{13}$ concaved at its periphery to embrace the top edge of the rounded portion $o^3$, said link moved by said lever and cam causing said sheave to turn said sleeve $o^x$ and the part $o^4$ of the burnishing tool about the journals $o$, the latter being located close to the surface of the heel between its ends. By the employment of the teeth and spaces uniting loosely the different portions of the burnishing tool acting directly against the surface of the heel, said portions may adapt themselves to heels of different height, and yet act on all portions of the height of the heel from its rand to its top lift, leaving no ridge whatsoever.

In Fig. 5, 201 represents one of the teeth extended inwardly from the part $n^5$ into a space 202 at the right-hand side of the part $o^4$, and 203 represents one of the teeth or projections extending from the right-hand side of portion $n^{14}$ into a recess at the left-hand side of the central part $o^4$.

The portions of the burnishing tool acting as a whole against the heel are kept in contact therewith with a yielding pressure due to the spring $t^{14}$ which may be regulated as stated and made more or less according to the stock in the heel. The frame $n^4$ carrying the part $n^5$ is also acted upon by a separate spring $o^{14}$ connected at its inner end with said frame, the free end of said spring being acted upon by a nut $o^{15}$ made adjustable by a screw $o^{16}$. The part $n^{12}$ carrying the part $n^{14}$ of the burnishing tool is acted upon by a separate spring $o^{17}$, the inner end of which is extended through a slot $o^{18}$ in frame $n^4$ and enters the part $n^{12}$, the outer end of said spring being acted upon by a nut $o^{19}$ made adjustable by a screw $o^{20}$. It will be understood that the part $n^5$ of the burnishing tool is movable bodily toward and from the part $n^{14}$, such provision being made to adapt the parts of the tool to heels of different or varying heights. The spring $r^3$ acts normally to draw the frame $n^4$ with its part $n^5$ toward the part $n^{14}$ to thus insure the contact of the part $n^5$ with the rand of the wheel, and when a heel has been burnished and the jack is removed, the spring $o^{17}$ acts immediately to depress the part $n^{14}$ until the stop $n^{133}$ forming part of arm $n^9$ meets a projection $n^{13x}$, (see dotted lines Fig. 5) at one side of said link $n^2$, and the link is consequently swung to the right, (see Figs. 3 and 6), letting the part $n^5$ be moved away from $n^{14}$ and also spring $o^{14}$ will act and cause the part $n^5$ to stand below the central part $o^4$ of the burnishing tool. The extent to which said frame $n^4$ may be moved to the right is regulated by a yielding stop $r^8$ shown as a nut mounted on a threaded rod $r^9$ to which is connected a spring $r^{10}$, the rotation of said stop so placing the same on said rod as to enable the said frame to abut said stop sooner or later.

As the heel is put in operative position, the top lift first contacts with the part $n^{14}$ slightly raising the same, and at the same time through spring $r^3$ drawing the frame $n^4$ to the left bringing the tool $n^5$ into working position against the heel-seat end of the heel with its projection in the rand-crease. Each jack has provisions for imparting thereto vertical movements while the burnishing tool acts on the side of the heel, the burnishing operation, as represented, commencing at one breast corner while the jack occupies its elevated position; the jack and shoe as herein provided for being lowered as the tool burnishes the heel from the first breast corner up to a point where the substantial curvature begins, and consequently the machine is simplified by so constructing the jacks that they are elevated when in their inoperative positions, they being dropped, as described, as the burnishing operation continues, the burnishing progressing along the side of the heel adjacent the breast corner, the jack remaining in its low position while the burnishing progresses about the curved back of the heel, the jack being again raised as the burnisher leaves the curved back of the heel and moves down over the opposite side of the heel to the opposite breast corner.

The jacks are maintained elevated through the bosses to be described while being swung away from and toward the table $a^{18}$, so that the feet of the jacks may take a bearing upon the surface of said table while the latter is in its elevated position. The upper end of the lower boss $w$ at the outer end of each gate through which is extended the jack rod $5^x$, is notched at its upper end, as shown in Figs. 1 and 14, and the lower end of the boss $4^x$ of each jack B, C, is notched in like manner, and viewing Fig. 14, the top ends of the two teeth $w'$ of boss $w$ are shown as receiving upon them and sustaining the lower ends of teeth $4'$ extended downwardly from the boss $4^x$, see Fig. 14. These teeth occupy this relation shown one to the other at all times when the foot $a^{15}$ of the jack is not resting on the table $a^{18}$. Each boss $4^x$, as the gates are swung away carrying the jacks, does not rotate, but simply travels in a circular path, but the bosses of the gates, the gates being swung about the rods $d^4$, turn in such manner that the teeth of the bosses $4^x$ move off the teeth $w'$ of the bosses $w$ whenever a foot $a^{15}$ of a jack arrives in position above table $a^{18}$, the jack foot being deposited on said table as the teeth move out of line, and vice versa. The teeth are put in contact as the foot of the jack swings off the top of the plate $a^{18}$.

I have stated that the jack is lowered and then raised while the heel is being burnished, the foot of the jack resting at such times on the top of the table $a^{18}$. The source of the upward movement of the table is the cam $f^2$, see Fig. 16, which acts on the roller stud $f'$ to raise the table, the weight of the table and jack keeping said roller against said cam and controlling the downward movement of the table and jack.

In Figs. 1 and 2, the burnishing tool is shown as contacting with the back of the heel where the heel is of greatest length at right angles to its breast, and Fig. 16 shows the cam in the position it occupies when said tool is in the position stated, and assuming that the cam $f^2$ is moved in the direction of the arrow thereon, said table will be held in its lowest position while the burnishing tool continues to travel about the rear part of the heel, or, until the roller $f'$ meets the part $f^{21}$ of the cam, when said part immediately acts to raise the jack, the rising movement thereof terminating when the outer end of said part $f^{21}$ passes said roller, and thereafter as the part $f^{22}$ arrives on said roller, the jack is lowered, its descent being arrested when said roller is being acted upon by the circular part $f^{23}$, the latter, while acting on said roller holding the jack and table depressed while the burnishing tool is moved backwardly about the rear end of the heel, and the tool having passed over said circular part, the part $f^{24}$ of the cam acts and raises the jack and table, and the part $f^x$ of the cam then travels over said roller and maintains the table in its highest position when the jack having a burnished heel may be removed from the table and another jack deposited thereon, the table remaining in its elevated position. As soon, however, as another jack has been deposited, as stated, on said table, a part of the cam $f^2$ acts and lowers the table letting the part $f^{22}$ act on the roller and retaining the table and jack in its lowered position, while the burnishing tool travels about the rear end of the heel, as stated.

When either jack, see jack B, occupies its inoperative position, should a shoe fail to be clamped therein, the starting device $h^2$ will not be pushed toward the actuator $e^3$ as described, and consequently said device will not enter that one of the slots $e^4$ in said actuator opposite said jack, and therefore when the carriage D is moved to the left as before provided for, the actuator will not be moved and with it the lever $e^5$ and the clutch lever referred to will, under the action of spring $a^{9x}$ be made to occupy a position to effect the opening of the clutch parts $a^{12}$ and $a^{13}$, as described, and the machine will be stopped.

Referring to Fig. 18, and assuming that the next operation will be to move the carriage D to the right to take with it the jack C and place the heel of the shoe carried thereby in the path of movement of the burnishing tool, such movement of the carriage is shown as having been completed in Fig. 19, and it will be seen that the end of the starting device stands opposite one of the slots $e^4$.

Now, if a shoe is applied to jack B, said starting device will be thrust into said slot, but in case a shoe is not applied to the jack, then the starting device will not enter said slot. When, therefore, the carriage D is moved to the left from its position Fig. 19, this being done after burnishing a heel on the jack C to remove said heel from the path of movement of said burnishing tool preparatory to turning the jack C outwardly and the jack B inwardly, the actuator $e^3$ will not be moved to the left and the machine will be stopped, but in the position shown in Fig. 18.

The workman, preparatory to starting the machine, will apply a shoe to jack B and then will push the starting device inwardly and said device will meet the outer side of said actuator $e^3$ and will compress the spring $e^2$, and to effect the starting of the machine, the workman will engage the knob $e^{3x}$ and push said actuator to the left until the starting device enters the notch $e^4$.

After a heel has been burnished, the end of the dog $h^7$, occupies the position shown, see jack B, and when said jack is turned outwardly from the position Fig. 17 into the position Fig. 18, the end of said dog overlaps the feeler $h^8$, the latter at such time being pressed in by the jack holding the shoe, but as soon as the shoe is removed, the end of the dog, under the action of spring $h^5$, turns the dog putting it again in line with the feeler, the spring 400 acting, see Fig. 1, to hold the starting device from the slot of the actuator.

In Fig. 4, the two dotted circles represent two positions of one of the bosses $d^6$ of the gate $C^2$ in the two positions occupied by the carriage D, one circle representing the position before the heel of the shoe carried by the jack sustained in said gate is moved laterally to put the same in the path of movement of the burnishing tool, and the other the position occupied when the gate having the jack has been moved to put the heel of the shoe in the path of movement of said tool.

I have herein shown the tool as composed of separate parts operatively connected together yieldingly, but this invention is not limited to making the tool in several pieces, although such construction is preferred. The acting faces of the tool or of the parts of the tool herein described present different shapes, each face being designed to conform to a particular part of the heel and the particular shape or configuration of these several pattern faces may be varied, it will be understood, according to the particular shape of the heel. The tool shown has a to and fro or oscillating motion, as stated herein, in the direction of the length of the heel about its sides and rear part from one to the other breast corner, and a portion at least of the tool, besides such motion, also has a movement in the direction of the height of the heel, such movement as herein provided for, being of less frequency than the to and fro movements or oscillations about the exterior of the heel.

I do not intend in any way to limit any of the following claims which I have drawn to cover broadly novel features of my invention, and it will be understood that while I have shown specific devices and means for actuating the various parts of the machine, I do not intend to limit my invention to the precise construction of parts shown, as a great many modifications in the shape and construction and mode of operation of such parts could be made without departing from my invention as expressed in the specification and in the claims following.

Having described my invention, what I claim as new and desire to secure by Letters Patent is:—

1. In a machine of the class described, a burnishing tool comprising a plurality of parts of different shapes in cross-section in the direction of the height of the heel and arranged side by side in the direction of the height of the heel, each section co-acting with a separate part of the heel with relation to its height, the central part of the tool presenting a practically straight face in its median line transversely of the height of the heel and means to actuate said plural parts of the tool simultaneously to cause them to burnish the heel surface.

2. In a machine of the class described, a burnishing tool presenting in cross-section in the line of the height of the heel a concaved and a convexed face, and actuating means therefor to cause each face to act on the same part of the heel in the direction of its length as the tool is carried about the exterior of the heel.

3. In a machine of the class described, a burnishing tool presenting a convexed face to act on the exterior of the top-lift and a concaved face to act on the exterior of the heel at its heel-seat, and two lips, one to act on the margin of the top-lift, and the other to enter the rand-crease and actuating means to cause the parts of the tool to act upon the work.

4. In a machine of the class described, a burnishing tool mounted to be moved in the direction of the height of the heel about a pivot in a plane at right angles to the height of the heel, combined with means for moving said tool to and fro about the exterior of the heel in the direction of the length of the heel.

5. In a machine of the class described, the combination of a jack for supporting a shoe, a head, a burnishing tool carried by said head, means to rotate the said head and to move said tool bodily to and fro on said head in contact with the exterior of the heel of a shoe supported by said jack, and means for changing the relative vertical position of the jack and tool as said head is rotated.

6. In a machine of the class described, a burnishing tool comprising a plurality of separate parts in the direction of the height of the heel, one of said parts having a practically straight face in its median line in the direction of its length, and curved in the direction of its width and of the height of the heel to conform to the shape of the heel, and automatically-operating tool-sustaining means, combined with means for moving said tool-sustaining means and tool in the direction of the length of the heel.

7. In a machine of the class described, a burnishing tool comprising a plurality of parts for acting each about a different contour of the heel, one of said parts having a practically straight face in its median line in the direction of its length, and curved in the direction of its width and of the height of the heel to conform to the shape of the heel, and automatically-operating tool-sustaining means, combined with means for moving said tool-sustaining means and tool in the direction of the height of the heel.

8. In a machine of the class described, a burnishing tool comprising a plurality of parts for acting about different contours of the heel, one of said parts having a practically straight face in its median line in the direction of its length, and curved in the direction of its width and of the height of the heel to conform to the shape of the heel, interlocking connections between said parts, combined with means for moving said tool in the directions of the length and height of the heel.

9. A burnishing tool having an irregular face to conform to the exterior of the heel in the direction of its height, means to cause said tool to travel about the exterior of the heel and means to impart to said tool bodily a series of short strokes practically in the line of the exterior of the heel whereby said tool acts progressively about said heel from one to the other breast corner and a work support to maintain the heel in operative position with relation to the tool during the burnishing operation.

10. In a machine of the class described, the combination of a work support, a burnishing tool to act upon the heel of a shoe sustained by said work support and having a working face conforming in one direction to the exterior form of the heel to be burnished and having a non-conforming contour in another direction and means for relatively moving the tool and the heel to cause the tool to move about the heel at varying speeds.

11. A burnishing tool shaped to contact with the exterior of the heel in the direction of its height, a shaft having its axis within the outline of the heel, and a head on said shaft carrying said tool, combined with means to turn said head and means for moving said tool bodily on said head, and means for oscillating the tool progressively about the exterior of said heel.

12. A burnishing tool composed of a plurality of parts shaped to contact with the exterior of the heel in the direction of its height, a shaft having its axis within the outline of the heel, and a head on said shaft carrying said tool, combined with means to turn said shaft and means for moving said tool bodily on said head, and means for oscillating said tool progressively about the exterior of said heel.

13. In a machine of the character described, the combination of a shoe support for sustaining a shoe, a burnishing tool comprising a series of independent members contacting with the heel of the shoe throughout its height and having surfaces extending transversely of the height, means for causing the tool to progress about the heel and present different portions of the tool surface to different portions of the heel, and means for varying the relative speed of the heel and tool at different portions of the heel.

14. In a machine of the class described, a head, a burnishing tool carried by said head, a shoe-heel support, means to rotate said head and to relatively move the head and shoe heel support to cause the tool to travel about the exterior of a heel from one to the other breast corner, and means to move said burnishing tool bodily to and fro on said head in the direction of its movement about the heel.

15. In a machine of the class described, a head, a burnishing tool carried thereby, a shoe-heel support, means to relatively move said head and support to cause the tool to travel continuously about the exterior of a heel from one to the other breast corner, and means to move said burnishing tool to and fro on said head and in the direction of movement about the heel during said relative movement of the head and support.

16. In a machine of the class described, a head, a burnishing tool carried thereby, a shoe-heel support, means to cause said tool to travel at a variable speed about the exterior of a heel from one to the other breast corner, and means to move said burnishing tool to and fro on said head while said tool travels about the heel.

17. In a machine of the class described, a head, a burnishing tool carried by said head, a shoe-heel support, means to cause said tool to travel about the exterior of a heel from one to its other breast corner and back again to its starting point, and means to move said burnishing tool bodily to and fro on said head while the tool travels about the heel.

18. In a machine of the class described, a jack, means acting automatically to move the same vertically as the heel is being burnished, a burnishing tool, means to cause the tool and a heel to relatively move laterally from one to its other breast corner, and independent means to oscillate said burnishing tool bodily during its traveling movement about the heel.

19. In a machine of the class described, a jack, a burnishing tool, means to cause the same to travel along the sides of the heel at a slow speed and about the end of a heel at a faster speed in the same direction from one to the other breast corner, and means to move the burnishing tool to and fro as the same is being carried about the exterior of the heel from one to its other breast.

20. In a machine of the class described, a head, a burnishing tool movably mounted on said head, means to cause the tool to travel at different speeds during each full stroke about a heel, and means to oscillate said tool at a uniform rate of speed while traversing the exterior of the heel.

21. In a machine of the class described, a jack to sustain a shoe, a head, a burnishing tool sustained thereby, means for changing automatically the level of said jack with relation to the path of movement of said tool, combined with means to cause said tool and a heel to move relatively from one to the other heel breast corner about a center within the outline of the heel, and independent means sustained by said head to impart to said burnishing tool a series of to and fro progressive strokes that said tool may act on the exterior of the heel from its top-lift to its heel-seat from one to the other breast corner.

22. In a machine of the class described, a head mounted on an axis within the outline of the exterior of the heel, and a burnishing tool having an axis of motion concentric with said head, combined with means to cause said tool to travel about the heel, and means for moving said burnishing tool bodily about its axis and relative to said head as the tool travels about the heel.

23. In a machine of the class described, a head having its center of motion within the outline of the exterior of the heel, and a burnishing tool mounted for oscillation and having its center of oscillation coincident with said head, combined with means for moving automatically said tool bodily in the direction of the length and also moving said tool in the direction of the height of the heel during the traveling of said tool about the exterior of the heel.

24. A burnishing tool composed of three members arranged in line with the direction of the height of the heel and contacting with the top-lift and heel-seat, means to move said tool progressively about an axis within the outline of the heel being burnished, and means to oscillate said tool about an axis at an agle to the height of said heel.

25. In a machine of the class described, a head, a shaft on which said head is mounted, a plate having a stud to pivot the same on said head in the line of said shaft, a burnishing tool, a cam loosely mounted on the shaft, means to revolve the cam about said shaft, and means intermediate said cam and plate to move the plate and said burnishing tool on said head.

26. In a machine of the class described, a movable head, and a burnishing tool, means for causing the tool to travel about the heel and means for imparting to the tool bodily a to and fro movement on said head in a direction of the traveling movement of the tool while the tool is traveling about the heel.

27. A heel-burnishing tool having a contour approximating substantially the shape of the heel to be burnished from the top-lift to the heel-seat throughout the exterior of the heel from one to its other breast corner, and means for turning the same progressively but at a varying speed about a longitudinal axis within the outline of the heel, that said tool may act progressively about said heel from one to its other breast corner.

28. In a machine of the class described, a top-lift burnisher, a rand burnisher, and an independent detachable intermediate body burnisher and means simultaneously to actuate said burnishers.

29. A burnishing tool composed of a series of independent members contacting with the heel throughout its height, and means for maintaining each of said members in contact with the heel, combined with means for loosely connecting the free ends of said members near their points of contact with the exterior of the heel and means for actuating said members simultaneously.

30. In a machine of the class described, a burnishing tool comprising a part to act on a top-lift, and an independent part to act on the heel-seat, and means set in operation by contact of a heel with one of said parts to cause it to be moved toward the other of said parts.

31. A heel-burnishing tool comprising a top-lift part, a heel-seat part, and an intermediate part, combined with means for imparting to and fro movement to said parts in the same direction about the exterior of the heel and for moving said intermediate part in the direction of the height of the heel.

32. A burnishing tool comprising a central and side members, one side member acting on the top-lift and the other on the heel-seat, combined with means for separating the heel-seat and top-lift members when a burnished heel is removed.

33. In a machine of the class described, a tool-carrier, a device sustained by said tool-carrier, a burnishing tool, combined with means for engaging and oscillating said device and said tool in the direction of the height of the heel and means to cause said tool to act about the heel at different speeds on different portions of the heel.

34. A heel-burnishing tool presenting a contour in the direction of the height of the heel approximating substantially the contour of the heel to be burnished, and means for moving said tool progressively and with a reciprocating motion about an axis within the outline of the exterior of the heel from one to the other breast corner thereof at different speeds and for imparting to and fro motion to said tool in the direction of the height of the heel.

35. A heel-burnishing tool composed of a plurality of parts and presenting a contour in the direction of the height of the heel approximating substantially the contour of the heel to be burnished, and means for turning the same progressively about an axis within the outline of the exterior of the heel from one to the other breast corner thereof, and means for oscillating said tool in the direction of the height of the heel about a center between the top-lift and heel-seat of the heel.

36. In a machine of the class described, a head, a shaft located within the outline of the exterior of the heel and sustaining said head, a burnishing tool, means to move the head and independent means to move said tool to and fro on said head during the movement of the head, combined with a shoe-holding jack, and means for changing the level of said jack with its shoe during the movement of the head.

37. In a machine of the class described, a shaft having a connected head, an eccentric surrounding said shaft, a main carrying plate located at the face of said head, and means to oscillate said plate, combined with an auxiliary plate having lugs to embrace said eccentric, the rotation of said shaft and head sliding said auxiliary plate on said main plate at right angles to the axis of said shaft, and a tool-carrier carried by said auxiliary plate.

38. In a machine of the class described, a head, means to impart to the same turning movements in opposite directions, a tool carrying plate carried by said head, a burnishing tool, and means to oscillate said plate and burnishing tool rapidly on said head as the head is moved.

39. In a machine of the class described, the combination with a burnishing tool, and a rising and falling shoe-holding jack, of a pattern other than the shoe carried by said jack, means operated by said pattern to control the extent of rising and falling movement of said jack and means to cause the burnishing tool to act upon the work during the movement of the jack.

40. In a machine of the class described, a burnishing tool, and a vertically movable shoe support, combined with a connected heel-breast rest, a pattern other than the shoe, means under the control of said pattern to determine the extent of the vertical movement of said shoe support and means for causing the burnishing tool to act upon the work during the movement of the shoe support.

41. In a machine of the class described, a burnishing tool, a shaft for moving said burnishing tool about the heel of the shoe, a shoe support means to move the same in a vertical plane during the action of the tool, and means to adjust said support parallel to said shaft.

42. In a burnishing machine, the combination of relatively movable burnishing means and shoe support, of coöperating means to vary the relative movements of the burnishing means and shoe support according to the shape of the heel to be burnished.

43. In a machine of the class described, a burnishing tool, and a shoe-sustaining jack, combined with a table to sustain said jack with the shoe in working position with reference to the burnishing tool, means to slide the jack toward the burnishing tool while on said table and operating means for the burnishing tool.

44. A burnishing tool, and means to move it, combined with a shoe-holding jack, means to sustain said jack, and means to move the jack in a curved path and then in a right line, to thereby place in the path of movement of the burnishing tool the heel of the shoe carried by the jack.

45. A heel-burnishing tool, a jack to sustain a shoe having a heel to be burnished, means to move said tool progressively about said heel from one to its opposite breast corner, and means relatively and laterally to move said jack and said burnishing tool after the completion of the burnishing of each heel.

46. In a heel-burnishing machine, a jack, a heel-burnishing tool, a pattern sustained by said jack, means for moving the jack with reference to the burnishing tool to present different portions of the heel to said tool, and a device intermediate said means and said pattern to cause said jack to be moved different distances according to the size or length of the heel being burnished.

47. In a machine of the class described, a plurality of shoe-holding jacks, burnishing means operable with relation to each of the said jacks, and means relatively and automatically to move said jacks in different paths into and out of operative relation to the burnishing means.

48. In a machine of the class described, a heel-burnishing tool, and shoe-holding jacks located when in their inoperative positions at opposite sides of the path of movement of said tool, combined with means to move said jacks in opposite directions toward and to place the heel of a shoe sustained thereby in position to be acted upon by said burnishing tool.

49. In a machine of the class described, burnishing means, a plurality of shoe-holding jacks, independent supports therefor, a carriage on which said jack supports are pivoted, combined with means to move said carriage longitudinally with said jack supports, and means to move said supports on said carriage alternately into and out of operative relation to said burnishing means.

50. In a machine of the class described, a burnishing tool, a shoe-holding jack, a table on which the jack when substantially in its operative position will be deposited, a variable fulcrum, a controller resting thereon, means to move said controller while sustained on said fulcrum, and means to momentarily remove said controller from said variable fulcrum while the jack is being moved from its operative into its inoperative position.

51. In a machine of the class described, a burnishing tool, a shoe-holding jack, a table on which the jack when substantially in its operative position will be deposited, a variable fulcrum, a controller resting thereon, and means to move said controller while sustained on said fulcrum.

52. In a machine for burnishing the heels of boots and shoes, the combination of a jack for sustaining a boot or shoe for treatment, a burnishing tool for acting on the heel of said boot or shoe, a table, means for placing the jack on said table when substantially in operative position, and means for raising the jack during the action of the burnishing tool.

53. In a machine of the class described a burnishing tool and means for operating it, a table, means to sustain the same in its elevated position, a jack, and means to sustain it in its elevated position, combined with means to deposit the jack on the table while elevated.

54. In a machine of the class described a burnishing tool and means for operating it, a table, means to sustain the same in its elevated position, a jack, and means to sustain it in its elevated position, combined with means to deposit the jack on the table while elevated, and means to lower the table and jack.

55. In a machine of the class described, a burnishing tool, a sliding carriage, a plurality of gates or arms pivoted thereon, a jack carried by each of said gates or arms, and means to swing the same one after the other toward said burnishing tool, combined with means thereafter to move each of said jacks into the path of movement of said tool, and means to move said jacks away from said burnishing tool after each heel has been burnished preparatory to returning said jacks into shoe-removing or inoperative position.

56. In a machine of the class described, a burnishing tool, a sliding carriage, a plurality of gates or arms pivoted thereon, a jack carried by each of said gates or arms, and means to swing the same one after the other toward said burnishing tool, combined with means thereafter to move each of said jacks laterally into the path of movement of said tool.

57. In a machine of the class described, a burnishing tool, means for actuating the same, a shoe-carrying jack, and means to clamp a shoe thereon, combined with means carried by the jack-sustaining means and actuated while clamping the shoe on said jack to insure the continuous operation of the heel burnishing machine.

58. In a machine of the class described a burnishing tool and operating means therefor, a shoe-holding jack, a controller, and means for moving said controller, combined with a variable fulcrum device for said controller, and a pattern to change automatically the position of said fulcrum device according to the length of the heel to insure a longer or shorter movement for said jack according to the length of the heel to be treated by the burnishing tool.

59. In a heel burnishing machine, the combination of a shoe supporting jack having a heel support to engage the breast of a heel, a burnishing tool shaped to contact with the heel throughout its height and to progressively treat the heel from one breast corner to the other, and means for operating the tool and to vary its speed of action on different parts of the heel contour.

60. A heel-burnishing machine comprising a heel support to engage the breast of the heel, a burnishing tool formed of different parts in the height of the heel to contact with said heel throughout its height, and automatic means to provide a progressive traveling and oscillating movement between said heel support and burnishing tool, and means for causing the tool to act with varying effect upon different portions of the heel.

61. A heel-burnishing machine comprising means for sustaining a heel, a head having its axis of motion within the outline of the heel to be burnished, and a burnishing tool carried by said head, combined with means for imparting rotative movement to said head and for moving said burnishing tool bodily on said head that the latter may act progressively about the exterior of the heel from one to its opposite breast corner, and means for causing the tool to act with varying effect upon different portions of the heel as it moves progressively from one breast corner to the other.

62. A heel-burnishing machine comprising means for sustaining a heel, a head having its axis of motion within the outline of the heel to be burnished, a burnishing tool carried by said head and having a surface to act on the heel simultaneously throughout its height to shape the same in accordance with the surface of said tool, and means for imparting automatically relative rotative movement to said heel-sustaining means, head and burnishing tool that the latter may act progressively about the exterior of the heel from one to its opposite breast corner, and means for varying the action of the tool as it moves progressively about the heel.

63. In a machine of the class described, a shoe support and a heel burnishing tool relatively movable progressively, and means automatically to vary the length of said relative movement according to the length of the heel being operated upon.

64. In a machine of the class described, a burnishing tool, combined with relatively-movable separately-sustained jacks and means to move said jacks separately into operative position relative to the burnishing tool.

65. In a heel burnishing machine, the combination of a burnishing tool, a plurality of separately supported and independently movable jacks, and means for causing one jack to move into and another out of operative position with relation to the burnishing tool.

66. In a heel burnishing machine, the combination of a burnishing tool, a plurality of separately supported and independently movable jacks, means for causing one jack to move into and another out of operative position with relation to the burnishing tool, and a table for supporting the jack when moved into operative position.

67. In a heel burnishing machine, the combination of a shoe support, a burnishing tool formed of sections in the length of the heel, said sections having interlocking portions, and means for raising and lowering the shoe support and operating the tool at varying speeds as it progresses about the heel.

In testimony whereof, I have signed my name to this specification, in the presence of two subscribing witnesses.

ANALDO M. ENGLISH.

Witnesses:
GEO. W. GREGORY,
MARGARET A. DUNN.

Copies of this patent may be obtained for five cents each, by addressing the "Commissioner of Patents, Washington, D. C."